United States Patent Office 2,966,517
Patented Dec. 27, 1960

2,966,517
FLUORINE COMPOUNDS

Murray Hauptschein, Glenside, Pa., assignor to Pennsalt Chemicals Corporation, Philadelphia, Pa., a corporation of Pennsylvania No Drawing. Filed July 15, 1957, Ser. No. 671,744

11 Claims. (Cl. 260—566)

This invention relates to fluorine compounds, and more particularly provides a novel method which results in the formation of a new and hitherto unknown series of nitrogen-containing carbon compounds, and additionally furnishes the resulting novel diazaperfluorocarbon reaction products.

It is an object of the present invention to provide novel diazafluorocarbons and a method of preparing the same.

It is a further object of this invention to provide a novel method whereby diazafluorocarbon compounds are produced.

Another object is to provide a novel synthesis resulting in formation of 1,4-dioxane.

These and other objects of the present invention will be apparent from a consideration of the following specification and claims.

This invention comprises the discovery that when ethylene oxide is contacted with a perfluoro-2-aza-1-alkene in the presence of a free radical source, there is obtained 1,4-dioxane, the dimer of ethylene oxide, and additionally, a diazafluorocarbon which is the dimer of the aforesaid azaalkene. The presently provided perfluoroazaalkene dimers constitute a new class of compounds.

The reaction which takes place between the perfluoroazaalkene and ethylene oxide may be represented by the following equation:

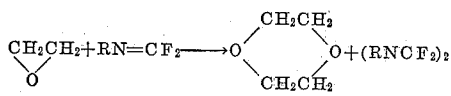

where R represents a perfluorocarbon radical and $(RNCF_2)_2$ represents the dimeric diazafluorocarbon product of the reaction. The occurrence of this dimerization of the present reactants is particularly surprising, since I have found that neither of the reaction components will produce any dimeric product when subjected to the same conditions alone.

These dimers are dissimilar to any previously known diazaperfluorocarbon. Infra-red analysis shows salient adsorption at $5.66\mu$, which is indicative of a $-N=CF-$ bond internally located in the dimer, as opposed to the terminal $-N=CF_2$ configuration present in the mono-azaalkene monomer. In the absence of a firm basis for the structure assignment, I prefer not to be bound by any theory and to claim the present products without reference to a particular structure. The presently provided compounds may be characterized and distinguished generally by description as dimers of perfluoro-2-aza-1-alkenes. With reference to formula, said dimers are compounds of the formula $(RNCF_2)_2$, where R is a perfluorocarbon radical. In the series of compounds having the presently provided dimeric structure and the aforesaid empirical formula, wherein successive members of this class of dimeric compounds differ by increments of $C_2F_4$, the first member of the series, of formula $C_4F_{10}N_2$, is characterized by a boiling point of about 39° C. at atmospheric pressure and a refractive index (sodium D line) at 22° C. having the value 1.27.

For the production of novel diazaperfluorocarbon compounds in accordance with the invention, there are employed as starting materials perfluoro-2-azaalkenes of the formula $RN=CF_2$, where R is a perfluorocarbon radical. By reference to a perfluorocarbon radical or perfluorinated compound herein is meant a radical or compound exhaustively substituted by fluorine atoms. Perfluoroazaalkenes embraced by the above formula are conveniently prepared by pyrolysis of carbamyl fluorides. One class of presently useful azaalkenes comprises compounds of the above formula where R represents a perfluoroalkyl (straight, branched or cyclic) radical containing up to 12 carbon atoms, as exemplified in azaalkenes such as $CF_3N=CF_2$; $CF_3CF_2N=CF_2$;

$CF_3CF_2CF_2N=CF_2$; $(CF_3)_2CFN=CF_2$ $CF_3CF(CF_3)CF_2N=CF_2$; $CF_3(CF_2)_5N=CF_2$ 2-perfluorocyclohexyl-2-aza-1, 1-difluoroethylene;

$CF_3(CF_2)_6N=CF_2$; $C_{10}F_{21}N=CF_2$; $C_{12}F_{25}N=CF_2$ 2-perfluorocyclohexylmethyl - 2 - aza-1,1-difluoroethylene, and the like. Preferably R is a lower perfluoroalkyl radical of the formula $C_nF_{2n+1}$ where $n$ is an integer of from 1 to 6.

The amount of ethylene oxide employed in the process of the invention may be varied considerably, but is desirably at least a molar equivalent of the quantity of perfluoroazaalkene with which it is contacted, and preferably in a molar ratio thereto ranging from 1:1 up to 3:1 or more. The present reaction apparently involves equimolecular quantities of reactants, and my experiments have shown that when less than a molar equivalent of ethylene oxide is present in the reaction mixture with the perfluoroazaalkene, the yield of florinated dimer is correspondingly diminished. Where lower yields of the diaza compound are not a detriment, such ratios are not precluded, however. When expedient, a large excess of ethylene oxide may be used, for example, so as to act as a solvent in which the reaction proceeds. If desired, other inert solvents or diluents such as ethers like diethyl ether may be used in conjunction with ethylene oxide. The presence of water is undesirable and to be avoided.

The process embodying this invention is catalyzed by free radicals. Advantageously, free radicals are produced by energization of the reaction mixture, for example, by exposure of the reaction mixture to radiation causing free radical generation, such as ultraviolet, gamma, X- or high energy electron radiation or combinations of these agencies. Actinic and especially ultraviolet radiation is preferred. If desired, extraneous sources of free radicals may be introduced into the reaction mixture; illustrative of such free radical sources are peroxides, such as ditertiary-butyl peroxide, benzoyl peroxide, and the like.

The temperature at which the reaction is conducted may range from −50° to 200° C. Temperatures of from about 0° to about 150° C. are preferred. Generally the reaction is conveniently conducted at the autogenous pressure of the reactants under these temperature conditions, but if desired, the pressure may range from subatmospheric to superatmospheric. Pressures up to 1000 atmospheres or more are operable. Depending on the temperature and other reaction conditions, completion of the reaction may require from a few minutes to several hours.

The presently provided dimers are stable compounds ranging from liquids boiling at slightly above room temperature to solid materials. They are useful for a variety of agricultural and industrial purposes. The compounds of this class are surface active agents and are particularly effective, at concentrations of 1% by weight or less, as surface-tension-reducing additives for oils and the like. Thus for example, a dimer provided in accordance with this invention is incorporated into a lubricant such as a petroleum-derived lubricating oil, thereby assisting in scouring undesirable deposits from systems in which the oil is employed. Similarly, the present products may be employed as surfactant additives in synthetic lubricants, coolant agents, petroleum solvents, gasoline, fuel oils and the like, to reduce deposit formation and to improve such properties as flow, spreading, penetration, sprayability and so forth. In addition, the class of dimers of the above formula where R represents a perfluorinated lower alkyl radical containing from 1 to 6 carbon atoms may be used as diluents in aerosol preparations to act as vapor depressants for propellants such as dichlorodifluoromethane and the like. The dimeric products provided hereby can also be used as hydraulic mechanism fluids, heat transfer media, transformer liquids, dielectrics, lubricants, and the like.

The invention is illustrated but not limited by the following examples:

Example 1

2-azaperfluoropropene, $CF_3N=CF_2$, is prepared by passing bis(trifluoromethyl) carbamyl fluoride at a flow rate of 0.5 to 0.6 moles per hour through a 26" length of a 1" O.D. platinum-lined nickel tube filled with activated carbon, at a temperature of $490 \pm 10°$ C. Conversions and yields of 2-azaperfluoropropene and carbonyl fluoride are above 90%.

Example 2

A mixture of 10.2 grams (0.0767 moles) of $CF_3N=CF_2$ and 4.6 grams (0.104 moles) of ethylene oxide is introduced under vacuum and sealed in a glass tube, after which the mixture is exposed at a temperature of 25–60° C. to ultraviolet irradiation from a Hanovia SH burner. At the end of 14 days, the originally homogeneous solution has separated into 2 layers. The tube is opened and the contents separated by vacuum transfer at room temperature. The amber-colored upper layer, which weighs about 7 grams, has a wide boiling range, from about 30° C./90 mm. to over 90° C./0.1 mm. The more volatile portion of this amber layer comprises approximately 3 grams of substantially pure 1,4-dioxane; the remainder is thought to be polymers of the azapropene and ethylene oxide. From the denser layer in the tube, by distillation in a Vigreux unit, there are separated 8 grams (78% yield) of a dimeric diazaperfluorocarbon, B.P. 39° C., $n_D^{22}$ 1.27. This material has the empirical formula $C_4F_{10}N_2$, as determined by elementary analysis:

|  | Found | Calculated |
|---|---|---|
| Percent C | 18.1 | 18.1 |
| Percent F | 71.3 | 71.4 |
| Percent N | 10.2 | 10.5 |

Example 3

A mixture of 7.0 grams (0.053 moles) of $CF_3N=CF_2$ and 12.1 grams (0.28 moles) of ethylene oxide sealed in a silica glass tube is exposed to ultraviolet irradiation at 25–60° C. for 9 days. The dimer of $CF_3N=CF_2$ is obtained in approximately 80% conversion and yield, and 1,4-dioxane is isolated as an accompanying product.

Similarly, the dimer of $CF_3N=CF_2$, accompanied by 1,4-dioxane, is obtained when a mixture of 0.05 moles of $CF_3N=CF_2$ with 0.10 mole of ethylene oxide is heated at 60° C. in the presence of benzoyl peroxide.

The diazaperfluorocarbon dimer of $CF_3N=CF_2$ is admixed in a 20:80 ratio by weight with $CF_2Cl_2$ to provide an aerosol propellant of diminished vapor pressure.

Example 4

By the procedure described in Example 2, a mixture of 1 part by weight of $CF_3CF_2N=CF_2$ and 1 part of ethylene oxide is exposed to ultraviolet irradiation to form the dimer of $CF_3CF_2N=CF_2$. This dimer has an elementary analysis corresponding to the empirical formula $C_6F_{14}N_2$.

Example 5

A mixture of 0.1 mole of N-perfluorocyclohexyl-2-aza-1,1-difluoroethylene with 0.1 mole of ethylene oxide is exposed to gamma irradiation. Products obtained comprise 1,4-dioxane and a dimer of the azaperfluorocarbon which has the empirical formula $C_{14}F_{26}N_2$.

By addition of the N-perfluorocyclohexyl-2-aza-1,1-difluoroethylene dimer of formula $C_{14}F_{26}N_2$ to gasoline to produce a concentration of 0.75 parts of the dimer per 100 parts by weight of gasoline, engine deposits are decreased, pre-ignition is suppressed, and the octane requirements of the engine are diminished.

While the invention has been described with reference to various particular preferred embodiments thereof, it will be appreciated that modifications and variations can be made without departure from the invention.

What is claimed is:
1. Perfluoroazaalkene dimers.
2. Diazaperfluorocarbons which are the dimers of perfluoro-2-aza-1-alkenes.
3. As new compounds, the dimers of perfluoro-2-aza-1-alkenes, said dimers being compounds of the formula $(RNCF_2)_2$ where R is a perfluorocarbon radical.
4. The compounds of claim 3, where R is a perfluoroalkyl radical containing up to 12 carbon atoms.
5. The compounds of claim 4, where R is a perfluorocarbon radical of formula $C_nF_{2n+1}$ where $n$ is an integer of from 1 to 6.
6. As a new compound, a dimer of perfluoro-2-aza-1-propene, said dimer having the empirical formula $C_4F_{10}N_2$ and characterized by a boiling point of about 39° C. at atmospheric pressure and a refractive index (sodium D light) at 22° C. having the value of about 1.27.
7. The method which comprises contacting perfluoro-2-aza-1-propene with ethylene oxide in the presence of ultraviolet irradiation and isolating from the resulting reaction product a dimeric produce of empirical formula $C_4F_{10}N_2$ characterized by a boiling point of about 39° C. at atmospheric pressure and refractive index (sodium D light) at 22° C. having a value of about 1.27.
8. The method of claim 7 wherein said reaction is carried out at a temperature of from —50° to 200° C.
9. The method which comprises contacting ethylene oxide with a perfluoroazaalkene of formula $RN=CF_2$ where R represents a perfluoroalkyl radical of from 1 to 6 carbon atoms, in the presence of ultraviolet radiation, and isolating from the resulting reaction product, a diazaperfluorocarbon of empirical formula $C_2F_4N_2R_2$ where R is as defined hereinabove.
10. The method which comprises contacting ethylene oxide with a perfluoro-2-aza-1-alkene in the presence of ultraviolet irradiation and isolating from the resulting reaction product a diazaperfluorocarbon of formula $(RNCF_2)_2$ where R is a perfluoroalkyl radical containing up to 12 carbon atoms.
11. The method of obtaining a perfluoroazaalkene dimer which comprises contacting a perfluoroazaalkene with ethylene oxide in the presence of ultraviolet irradiation.

References Cited in the file of this patent

UNITED STATES PATENTS

| 2,191,922 | Bruson | Feb. 27, 1940 |
| 2,489,091 | Kharasch | Nov. 22, 1949 |
| 2,643,267 | Pearlson et al. | June 23, 1953 |